United States Patent [19]

Wolff

[11] Patent Number: 5,724,794
[45] Date of Patent: Mar. 10, 1998

[54] CUTTING DEVICE WITH A CONTROL DEVICE

[75] Inventor: Michel Wolff, Waltenheim Sur Zorn, France

[73] Assignee: Kuhn S.A., Saverne Cedex, France

[21] Appl. No.: 593,678

[22] Filed: Jan. 29, 1996

[30] Foreign Application Priority Data

Jan. 27, 1995 [FR] France ................... 95 01142

[51] Int. Cl.⁶ ........................................ A01D 34/66
[52] U.S. Cl. .................. 56/6; 56/15.2; 56/15.7; 56/218; 56/228; 56/DIG. 3; 56/DIG. 14
[58] Field of Search .................... 56/14.9, 15.1, 56/15.2, 15.3, 15.4, 15.7, 15.8, 6, 218, 228, 321, DIG. 3, DIG. 9, DIG. 10, DIG. 14

[56] References Cited

U.S. PATENT DOCUMENTS

| | | | |
|---|---|---|---|
| 4,972,664 | 11/1990 | Frey | 56/15.2 X |
| 5,241,809 | 9/1993 | Wolff et al. | 56/16.2 |
| 5,353,579 | 10/1994 | Wolff | 56/15.2 |
| 5,353,580 | 10/1994 | Wolff | 56/15.2 |

FOREIGN PATENT DOCUMENTS

| | | |
|---|---|---|
| 0451074 | 10/1991 | European Pat. Off. . |
| 2437767 | 4/1980 | France . |
| 2584889 | 1/1987 | France . |
| 2675980 | 11/1992 | France . |
| 7115956 | 5/1973 | Germany . |
| 2022382 | 12/1979 | United Kingdom . |

*Primary Examiner*—Terry Lee Melius
*Attorney, Agent, or Firm*—Oblon, Spivak, McClelland, Maier, & Neustadt, P.C.

[57] ABSTRACT

A cutting device includes a cutting mechanism, a hitching structure designed to be connected to a motor vehicle, a support beam joined to the hitching structure and to the cutting mechanism and a traction device. The traction device is comprised of at least one draw-spring designed to lighten the cutting mechanism during operation and a control device designed to void the action of the at least one draw-spring when the cutting device is placed. The control device has, among other things, a rod at one of the ends to which the at least one draw-spring is attached. The control device is comprised of a cylinder which has the rod, a body, a piston which separates the body into first and second chambers, and a fluid circuit which has a device which allows the fluid to enter the first chamber located on the side of the at least one draw-spring when the latter must be tightened, and allows the fluid to leave the first chamber when the at least one draw-spring must be relaxed.

35 Claims, 7 Drawing Sheets

CUTTING DEVICE WITH A CONTROL DEVICE

BACKGROUND OF THE INVENTION

1. Field of the Invention

The present invention relates to a cutting device which is comprised of a cutting mechanism which, while it is in operation, works crosswise to a direction of operation, a hitching structure designed to be connected to a motor vehicle, and a support beam joined, on one hand, to the hitching structure with the help of a first journal with an axis directed towards the front and, on the other hand, to the cutting mechanism with the help of a second journal with an axis also directed to the front. The cutting device also includes a traction element comprised of at least one draw-spring which, while in operation, lightens the cutting mechanism and a control device designed to invalidate the action of the draw-spring(s) at the time of the placement. The control device is comprised of, among other things, a rod at one of the ends to which the draw-spring(s) is (are) attached.

2. Discussion of the Background

A related cutting device is described in document FR-A-2 675 980. The control device—of a mechanical type—of this related cutting device is comprised of a body located on the hitching structure with the help of a pivoting axis connection which is directed to the front when the cutting device is in working position. The rod, which is attached to one end of the draw-spring designed to lighten the cutting mechanism, is guided crosswise in the body so that it can slide more or less parallel to the longitudinal axis of the draw-spring. This rod represents a shoulder which acts as a retractable stop. This retractable stop is in the form a spring blade of which one of the ends is fixed on the body and of which the other end has the shape of a fork and is designed to be placed between the body and the shoulder of the rod in order to limit the exit of the rod from the body.

A remote control is located between the retractable stop and a crutch support designed to maintain the support beam in a placement position when the cutting device is uncoupled from the motor vehicle. This crutch support is attached to the support beam so that it can be positioned when it must support the support beam or, on the other hand, so that it can be retracted when it is transported or it is in operation.

By pivoting the crutch support in a placement position, the remote control, comprised of a cable and a casing, releases the retractable stop and allows the rod to exit more from the body, which causes the draw-spring to relax.

By pivoting the crutch support in its retracted position, the remote control no longer acts on the retractable stop. It can now again engage between the shoulder of the rod and the body as soon as the rod is sufficiently retracted in the body when the cutting mechanism pivots in its vertical transport position. By doing this, the draw-spring can again lighten the cutting mechanism since the latter will be pivoted into a horizontal working position.

This related control device works well when the user respects the chronology of the different operations which are to be carried out in order to shift the cutting device from the transport position into the placement position. First of all, the user must pivot the crutch support in the placement position in order to relieve the retractable stop via the remote control. This maneuver is possible since the shoulder is not in contact with the retractable stop in the transport position. If, on the other hand, the user does not carry out this step before he pivots the cutting mechanism into a horizontal position, he can no longer relieve the retractable stop because the tension exerted by the draw-spring on the rod pushes the shoulder of the rod too much against the retractable stop. The cutting device therefore cannot be placed without risk unless the whole operation is started over from the beginning.

SUMMARY OF THE INVENTION

Therefore, an object of this invention is to remedy the above-noted inconvenience of the related art.

For this purpose, the cutting device in accordance with the present invention is characterized in that the control device is comprised of a cylinder which includes a rod, a body, a piston connected to the rod which divides the body into two chambers, and a fluid circuit which has a device which allows fluid to enter into the first chamber located on the side of the extension spring(s) when the latter must be tightened and the exit of the fluid of said first chamber when the extension spring(s) must be released.

With such a control device, the draw-spring(s) can be released without it being necessary to adhere to a certain order in the different operations necessary to shift from a transport position to a placement position. In effect, it suffices to simply allow the fluid to leave the first chamber of the cylinder, with this being possible when the draw spring(s) is (are) released (cutting mechanism in vertical position) or tightened (cutting mechanism in horizontal position).

Therefore, the placement of the cutting device in accordance with the present invention is substantially simplified and can be carried out without any risks.

It is also possible for the device which allows the fluid to enter the first chamber or, respectively, to leave said first chamber, to have a device which slows the exit of the fluid. Due to this characteristic, it is possible to release the draw spring(s) gradually. This deceleration device is advantageously comprised of at least one throttle.

This device allows the fluid to enter or, respectively, leave the first chamber so that it can then carry a valve.

If this device is comprised of a unit which slows the flow of the fluid from the first chamber, then this valve can furthermore advantageously be connected in series with said deceleration device. However, this valve can also, in this case, be comprised of a distributor which prevents any fluid from entering the first chamber or, respectively, from leaving the chamber when it is in a first position and which makes the deceleration device operational when it is in a second position. The deceleration device can furthermore advantageously be integrated into said distributor.

It is also possible to have a remote control designed to control said valve. This remote control preferably causes the valve to open while there can be an automatic recall device which places and maintains said valve in its closed position. This automatic recall device is furthermore preferably integrated into said valve. The device allows the fluid to enter the first chamber or, respectively, to leave the chamber so that it can, among other things, have a non-return valve which allows the fluid to enter the first chamber but which prevents if from leaving the chamber.

This non-return valve and the unit which slows the fluid from leaving the first chamber can be integrated into the distributer. The non-return valve is operational when the distributer is in a first position and said deceleration unit is operational when said distributer is in a second position.

Here, too, it is possible to have a remote control designed to activate said distributer. Preferably, this remote control is designed to place the distributer into its second position, whereas it is possible to have an automatic recall device designed to place and maintain said distributer in its first position. This automatic recall device in this case, too, is preferably integrated into said distributer.

Advantageously, said non-return valve is connected in parallel with said valve or with said valve connected in series with said deceleration unit. This non-return valve can even be integrated into the piston.

In one embodiment of the control device it is possible that the rod crosses the two chambers of the body of the cylinder so that they present cross sections which are more or less equal. In this case, the fluid circuit connected to the cylinder can advantageously be a closed circuit.

However, in a different embodiment of the control device, it is possible that the rod crosses only the first chamber of the body of the cylinder and that the fluid circuit connected to the cylinder has a reservoir.

In addition, the cutting device in accordance with the present invention can have a set down element connected to the beam support and designed to maintain it in a placement position when the cutting device is uncoupled from the motor vehicle, with this set down element being placed in a retracted position when the cutting device is connected to the motor vehicle.

In the cases in which there is a remote control designed to activate the valve or the distributer of the non-return valve or the deceleration unit of the control device, this remote control can be advantageously connected to the set down element in a manner in which the placement of the set down element into the placement position opens said valve or places said distributer into its second position.

It is also possible that the body of the cylinder of the control device is connected to the hitching structure with the help of a bonding, preferably a pivoting axis, which is at least parallel to the axis of the first journal.

It is also possible, among other things, to have a reactivation device for the control device. Preferably, this reactivation device automatically reactivates the control device when said cutting device is moved from the placement position into the transport position. This reactivation device can be comprised of, at the level of the connection of the draw-spring(s) to the cutting mechanism, a slide which can slide at least parallel to the longitudinal axis of the drawspring(s). This slide is fit with at least a first stop designed to limit the exit of the slide and a second stop designed to limit the reentrance of said slide.

It is also possible to have an adjustment device which adjusts the intensity of the draw-spring(s). This adjustment device which adjusts the intensity, can be comprised of, on the level of the draw-spring(s) to the cutting mechanism, a slide which can slide at least parallel to the longitudinal axis of the draw-spring(s). This slide is fit with a first stop designed to limit the exit of the slide and a second adjustable stop designed to limit the more or less significant reentrance of said slide.

The reactivation device of the control device and the adjustment device for the intensity of the lightening can furthermore be comprised of one and the same device.

The present invention therefore relates to a cutting device which comprises a cutting mechanism which, while in operation, works crosswise to a direction of operation; a hitching structure designed to be connected to a motor vehicle; a support beam joined to the hitching structure with a first journal having an axis directed towards a front, and to the cutting mechanism with a second journal having an axis directed to the front; and a traction element which is comprised of at least one draw-spring and a control device, the at least one draw-spring designed, while in operation, to lighten the cutting mechanism and the control device designed to invalidate the action of the at least one draw-spring when the control device is uncoupled from the motor vehicle, the control device being comprised of at least a rod, the rod having one end attached to the at least one draw-spring.

The control device of the present invention comprises a cylinder which includes the rod; a body; a piston connected to the rod which divides the body into first and second chambers; and a fluid circuit which has a device which allows the fluid to enter into the first chamber located on a side of the at least one draw-spring when the at least one draw-spring must be tightened, and allows the fluid to leave the first chamber when the at least one draw-spring must be relaxed.

Other characteristics and advantages of the invention will appear in the following description with reference to the attached drawings which represent, by way of non-limiting example, one form of implementation of the mower in accordance with the invention wherein.

DETAILED DESCRIPTION OF THE PREFERRED EMBODIMENTS

Referring now to the drawings, wherein like reference numerals designate identical or corresponding parts throughout the several views, FIGS. 1 through 7 represent a cutting device in accordance with the invention which, in this example, is in the form of a mower (1) coupled to a motor vehicle (2).

The mower (1) consists mainly of a frame (3), having a hitching structure (4) and a support beam (5), and a cutting mechanism (6).

Figure 3:
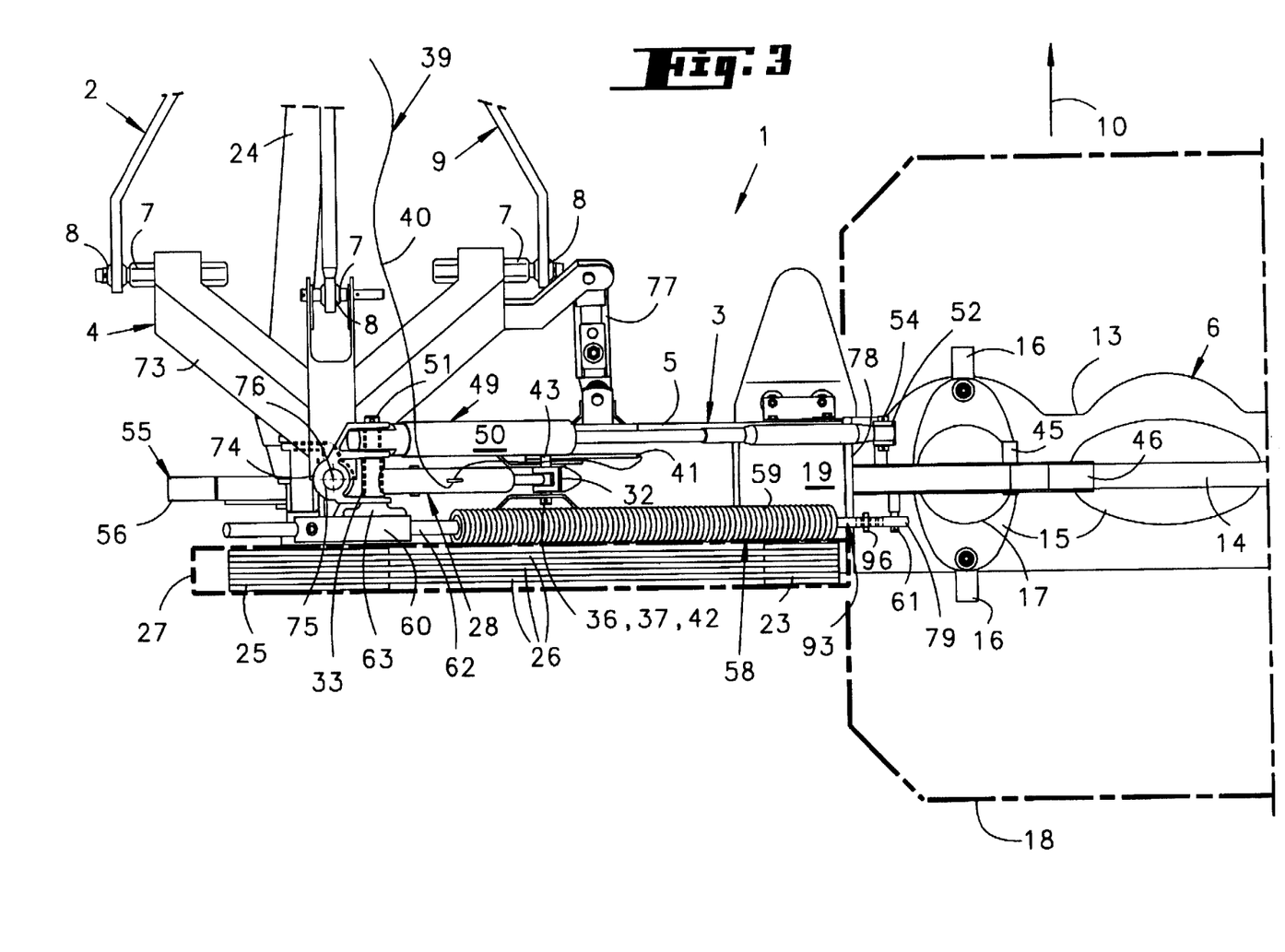
FIG. 3 shows a top view of the cutting device shown in FIG. 1.

Hitching structure (4) is equipped, at its front part, with three hitching points (7) intended to be connected to three hitching points (8) of lifting device (9) of motor vehicle (2). Support beam (5) extends, during work, crosswise to direction of work (10) (FIG. 3). At one of its longitudinal ends, support beam (5) is connected to hitching structure (4) by a first journal (11) with geometric axis (11') directed in the direction of advance and extending, as seen in direction of advance (10) during work, at least approximately in the vicinity of the center of the triangle defined by the three hitching points (7) of hitching structure (4). At its other longitudinal end, support beam (5) of frame (3) is connected to a longitudinal end of cutting mechanism (6) by a second journal (12) with geometric axis (12') which is at least parallel to the geometric axis (11') of the first journal (11). Due to such a frame, cutting mechanism (6) can, during work, extend beside the path of motor vehicle (2) and adapt easily to the contour of the ground.

Cutting mechanism (6) comprises a cutting bar (13) surmounted by a carrying structure (14). As seen in FIGS. 1 to 5, cutting bar (13) is equipped with multiple disks (15) equipped on their periphery with cutting tools (16). During work, these disks (15) rotate around geometric axes directed upward. Moreover, in a manner known to one skilled in the art, these disks (15) which are at a longitudinal end of cutting bar (13) are surmounted by a drum (17) rotating around the same geometric axis as the disk (15) that it surmounts. These two drums (17) calibrate the swaths of product cut by cutting tools (16).

Carrying structure (14), which surmounts cutting bar (13), is intended to support protection elements (18) (shown in chain lines in FIG. 3). This carrying structure (14) is attached to cutting bar (13) by a transmission housing (19). The latter performs a dual function: it connects cutting mechanism (6) to support beam (5), and it also contains a part of the drive elements for driving disks (15) and drums (17).

Transmission housing (19) is actually equipped with two cylindrical bearing surfaces (20) forming the second journal (12) and able to rotate in the flanges of a yoke (21) integral with support beam (5). These cylindrical bearing surfaces (20) are, in a manner known to one skilled in the art, made in the form of bearings in which is rotatably guided an input shaft (22) whose axis of rotation is coaxial with geometric axis (12') of second journal (12) and which is connected to the drive with the drive elements contained in the transmission housing (19).

Figures 1, 2:
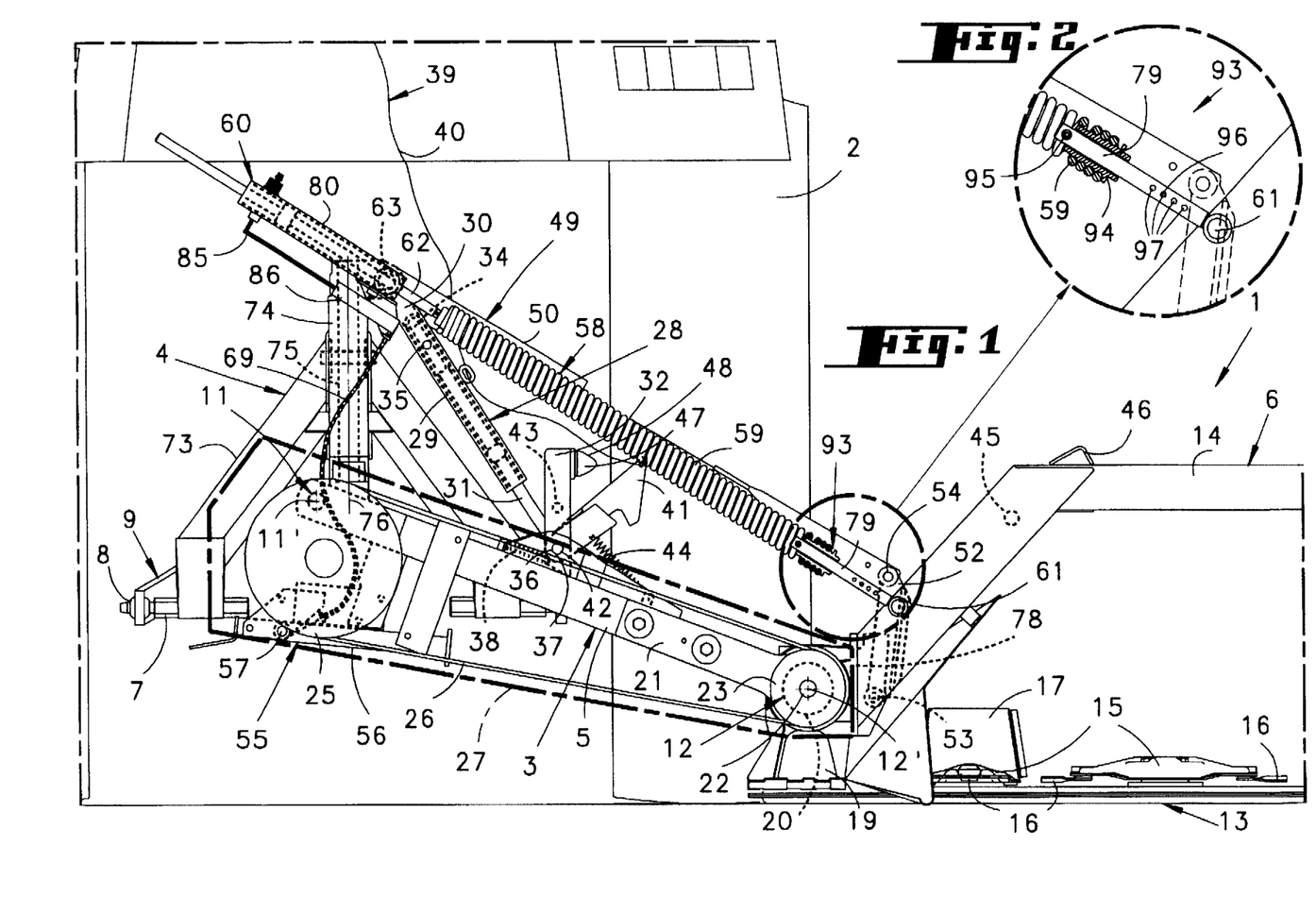
FIG. 1 shows, in an operating position, a cutting device in accordance with the invention as seen from behind in a forward working direction and connected to a motor vehicle.
FIG. 2 shows a portion viewed in accordance with FIG. 1 on an enlarged scale.

To the rear, input shaft (22) extends beyond transmission housing (19) and is rotatably connected with a first pulley (23). This pulley (23) is part of the transmission elements of mower (1) which transmit the movement from the power takeoff (not represented) of motor vehicle (2) to input shaft (22) of transmission housing (19). These transmission elements further comprise a drive shaft with universal joints (24) (FIG. 3, a second pulley (25) and belts (26). Drive shaft (24) is connected in rotation with second pulley (25) connected to support beam (5) and having an axis of rotation directed substantially in the direction of advance (10) during work when mower (1) is in mowing position (FIGS. 1 and 3). The transmission of the movement from the second pulley (25) to the first pulley (23) is provided by belts (26) which are wound on said pulleys (23, 25). A protective hood (27) (shown in chain lines) partially surrounds pulleys (23, 25) and belts (26).

As can be seen in FIGS. 1 to 5, frame (3) of this mower (1) according to the invention is equipped with a locking element (28) for locking the position of support beam (5) relative to hitching structure (4) around geometric axis (11') of first journal (11). This locking element (28) consists of a limiter (29) comprising a pipe (30) and a tie-rod (31), and a lock (32).

Figure 4:
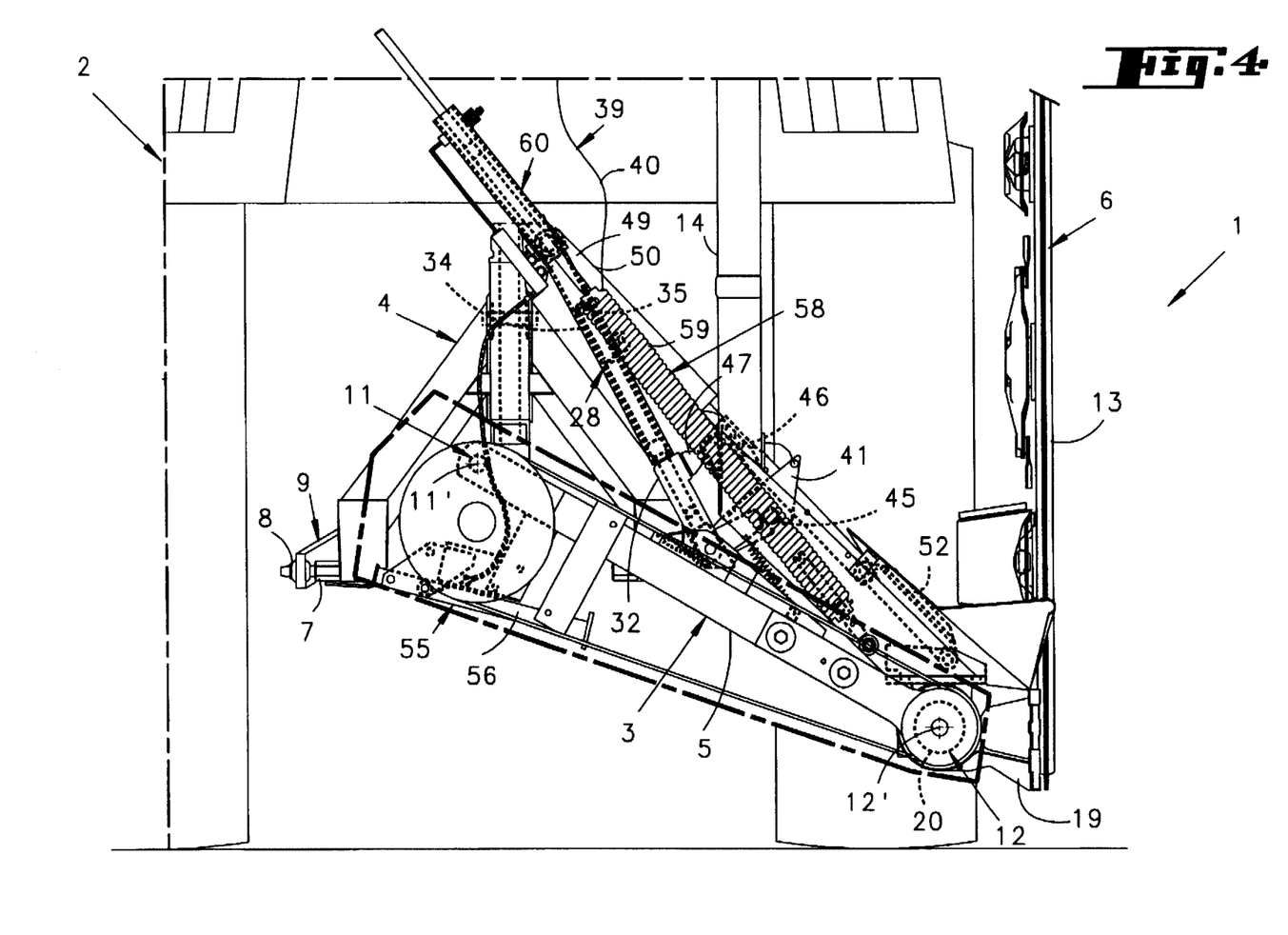
FIG. 4 shows, in a transport position, the cutting device of FIGS. 1 and 3 as seen from behind in a forward direction.

Pipe (30) is connected at one of its longitudinal ends to the upper part of hitching structure (4) by a joint (33) having a geometric axis substantially parallel to geometric axis (11') of first journal (11). Inside this pipe (30) slides a part of tie-rod (31) provided with a slot (34) and having a longitudinal axis substantially coaxial with the longitudinal axis of said pipe (30). A pin (35) attached to pipe (30) goes through slot (34), thus limiting the translation of tie-rod (31) in pipe (30). The longitudinal end of the other part of tie-rod (31), which extends outside pipe (30), is connected to the median part of support beam (5) via a joint (36) having a geometric axis substantially parallel to geometric axis (11') of first journal (11). As a result, limiter (29) limits the pivoting of support beam (5) relative to hitching structure (4) around geometric axis (11') of first journal (11), and so the downward movement of second journal (12) which connects cutting mechanism (6) to support beam (5). The user can therefore, for example, actuate lifting device (9) of motor vehicle (2), to lift cutting mechanism (6), which remains more or less horizontal. This position of the mower (1) is generally called the "swath position". When the limiter (29) is extended to its maximum position, it can be locked by lock (32). For this purpose, lock (32) is connected to support beam (5) by a pivot connection (37) with a geometric axis substantially coaxial with the geometric axis of joint (36) connecting tie-rod (31) of limiter (29) to the support beam (5). The lock (32) can be pivoted around said geometric axis from an unlocked position in which tie-rod (31) is permitted to slide inside pipe (30) to a locking position in which lock (32) covers the part of tie-rod (31) which extends outside pipe (30) (FIG. 4). In this latter position, lock (32) prevents any translation of tie-rod (31) inside pipe (30), so that locking element (28) is locked.

The lock (32) is normally biased into an unlocked position by the action of a spring (38) extending between support beam (5) and lock (32). Conversely, a remote control element (39) makes it possible for the user to bring lock (32) into, and to hold it at least temporarily in, the locking position.

As shown in FIGS. 1 to 5, remote control element (39) is a small rope (40), intended to be handled by the user from motor vehicle (2) and connected to a catch (41) able to pivot lock (32) into its locking position. Lock (32) includes a pin (43) which catch (41) engages to pivot said lock (32) into its locked position when the user pulls on small rope (40). For this purpose, catch (41) is connected to support beam (5) via a pivot connection (42) with a geometric axis substantially coaxial with the geometric axis of pivot connection (37) of lock (32). The user can therefore, when mower (1) is in swath position, lock limiter (29) by pulling on small rope (40).

As soon as the user stops pulling on small rope (40), catch (41) pivots toward its initial position under the action of a spring (44) attached to support beam (5). Advantageously, catch (41) makes it possible, in addition, to lock cutting mechanism (6), when the latter is brought into a raised transport position (FIG. 4) by pivoting around geometric axis (12') of second journal (12). As can be seen in FIG. 4, carrying structure (14) of cutting mechanism (6) includes a latching element (45) to which catch (41) is hooked when small rope (40) is released. It thus is possible to lock cutting mechanism (6) in its raised transport position. The unlocking of cutting mechanism (6) is performed by pivoting catch (41) against spring (44) by small rope (40).

In FIG. 4, it is also seen that lock (32) is held in its locked position by a holding element (46). The latter is attached to carrying structure (14) of cutting mechanism (6) and holds lock (32) in its locked position when cutting mechanism (6) is in a raised position. As a result, as soon as cutting mechanism (6) is lifted, locking element (28) is automatically locked, which prevents the pivoting of support beam (5) relative to hitching structure (4) around geometric axis (11') of first journal (11).

Further, lock (32) of locking element (28) is surmounted by an elastically deformable element (47) which is made in the form of a rubber stop (48). When cutting mechanism (6) is fully in the transport position, holding element (46) of said cutting mechanism (6) slightly compresses this stop (48) so that the latter, during the displacement of cutting mechanism (6) from the transport position to the swath position, acts as a spring to begin this movement.

Conversely, the passage of cutting mechanism (6) from the swath position, where it extends at least approximately horizontally above the ground, into the raised transport position is performed by a maneuvering element (49). In this embodiment, this maneuvering element (49) consists of a single-action hydraulic cylinder (50). This hydraulic cylinder (50) is connected at one of its longitudinal ends to hitching structure (4) by a joint (51) (FIG. 3) and at the other of its longitudinal ends to carrying structure (14) of cutting mechanism (6) by a pivoting lever (52). The latter is connected to carrying structure (14) of cutting mechanism (6) by a pin (53) and to hydraulic cylinder (50) by an additional pin (54). Moreover, joint (51) connecting hydraulic cylinder (50) to hitching structure (4) and joint (33) connecting pipe (30) of locking element (28) to said hitching structure (4) are substantially coaxial and are realized in one single piece.

During the setting down of this mower (1) (FIG. 5), cutting mechanism (6) rests longitudinally on the ground and support beam (5) is supported by a set down element (55). In this embodiment, set down element (55) is a prop (56) connected to support beam (5) in the vicinity of first journal (11) with a pivot connection (57) having a geometric axis substantially parallel to geometric axis (11') of first journal (11). As a result, prop (56) can, for transport, be pivoted from a set down position in which prop (56) can support the support beam (5) (FIG. 5) into a position for transport and for work, in which prop (56) is retracted (FIG. 1 through 4).

Figure 5:
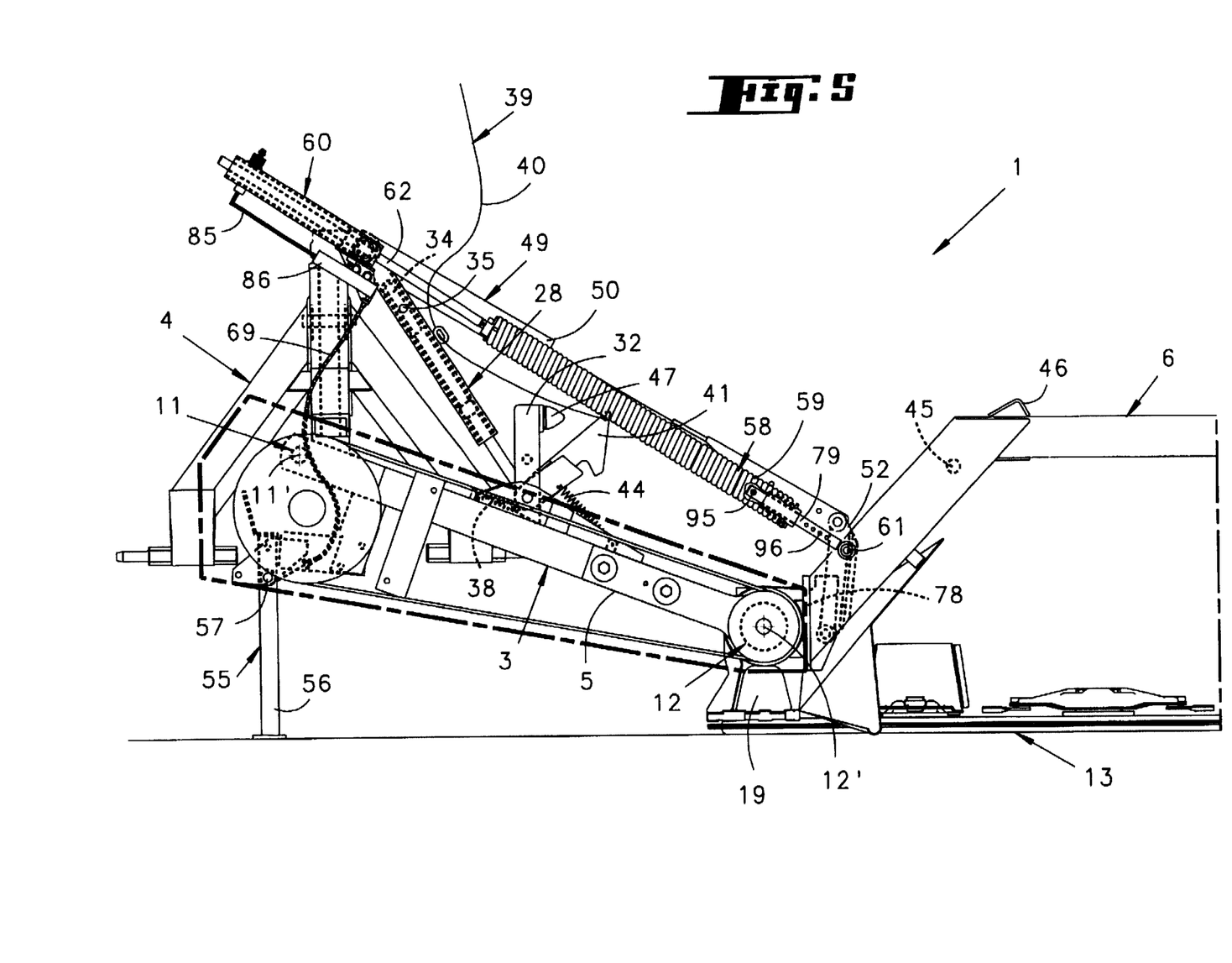
FIG. 5 shows, in a placement position, the cutting device of FIGS. 1 through 4 from behind (in forward direction of the cutting device in operation)

In FIG. 5, which shows mower (1) in set down position, it is also seen that locking element (28) is unlocked, i.e., that it is possible in this position to pivot hitching structure (4) relative to support beam (5) around geometric axis (11') of first journal (11). Such an arrangement considerably facilitates the hitching of mower (1) to three points (8) of lifting device (9) of motor vehicle (2).

Mower (1) according to the invention also comprises a traction element (58) intended to lighten cutting mechanism (6) during work. This traction element (58) acted between hitching structure (4) and cutting mechanism (6), and consists mainly of a draw spring (59) joined with a control device (60). Draw spring (59) is connected to cutting mechanism (6) by a pivot connection (61) with a geometric axis substantially parallel to geometric axis (12') of second journal (12), and to control device (60) by a tie-rod (62) having a geometric axis approximately coaxial with the longitudinal axis of said draw spring (59). Control device (60) is connected to hitching structure (4) with a pivot connection (63) with a geometric axis substantially parallel to geometric axis (11') of first journal (11). Advantageously, in this embodiment this pivot connection (63) connecting control device (60) to hitching structure (4) and joint (51) connecting hydraulic cylinder (50) to said hitching structure (4) are substantially coaxial.

The control device (60) makes it possible to cancel the action of draw spring (59) during the setting down process.

Figure 6:
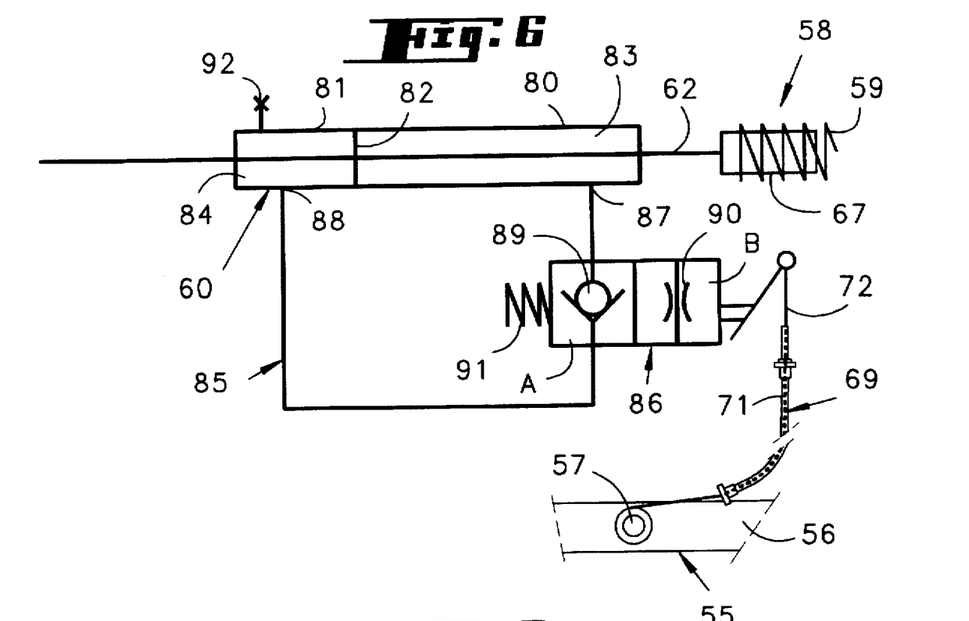
FIG. 6 shows a schematic view of a first embodiment of a control device designed to equip the cutting device according to the invention, said control device being active.
Figure 7:
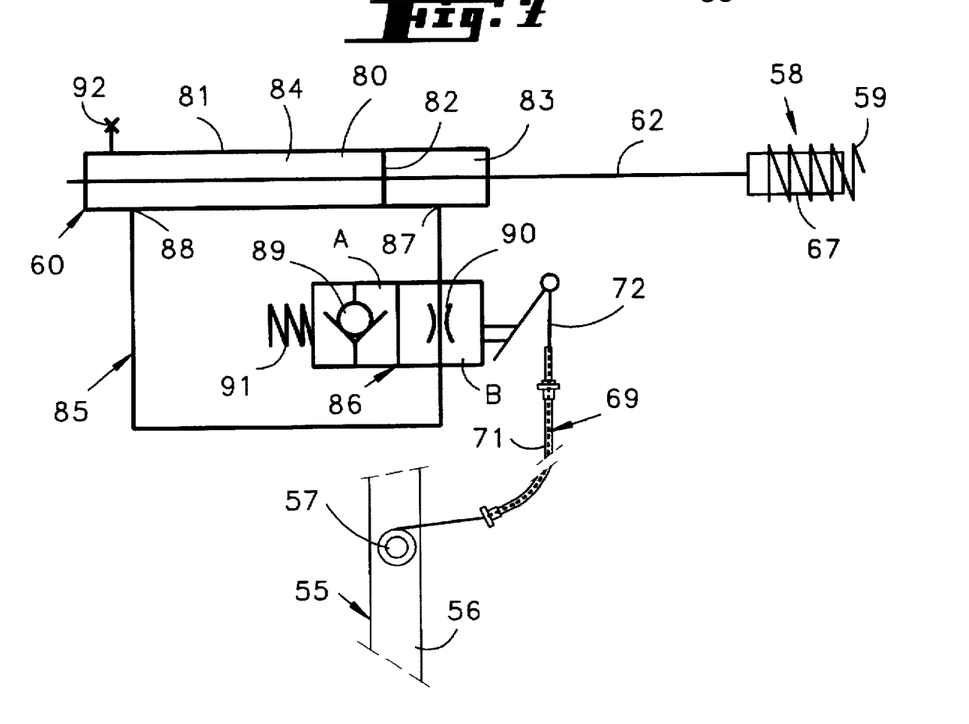
FIG. 7 shows the control device in accordance with FIG. 4 in an inactive position.

As can be seen in FIG. 6, the control device (60) has a hydraulic cylinder (80) which is comprised of a body (81) connected to the hitching structure (4) with the help of a pivot connection (63) described above and the rod (62) is realized in the form of a double rod which extends across the body (81) and screws into one of its ends in a connecting element (67) of the draw-spring (59). A piston (82), firmly with the rod (62), divides the body (81) of the hydraulic cylinder (80) into two chambers (83, 84) with more or less equal cross sections: a first chamber (83) is located on the side of the end of the rod (62) connected to the draw-spring (59) and a second chamber (84) is located on the side of the free end of the rod (62). The rod (62) from the piston (82) of the hydraulic cylinder (80) is intended to occupy two positions:

- a working position in which the draw-spring (59) is tightened and lightens the cutting mechanism (6) (FIG. 6),
- a placement position in which the draw-spring (59) is relaxed (FIG. 7).

To that effect the control device (60) has a closed hydraulic circuit (85) which connects the two chambers (83, 84) of the hydraulic cylinder (80). This hydraulic circuit (85) has a distributer (86) connected on one hand to an opening (87) of the first chamber (83) and on the other hand to an opening (88) of the second chamber (84).

The distributer (86) can be placed in two different positions (A; B): a first position (A) which allows only the transfer of fluid from the second chamber (84) into the first chamber (83) with the help of a non-return valve (89) (FIG. 6), and a second position (B) which allows the circulation of the fluid between the two chambers (83, 84) across a throttle (90) (FIG. 7). This distributer (86) also has an automatic recall device (91) which maintains, at rest, the distributer (86) in the first position (A). The distributer (86) is put into the second position (B) directly by the set down element (55) which acts on the control device (60) with the help of a remote control (69). In this manner and when the prop (56) of said set down element (55) is in the retracted position (working), the draw-spring (59) can lighten the cutting mechanism (6) and, vice versa, when the prop (56) is in the placement position, the action of the draw-spring (59) is voided. In this embodiment example the remote control (69) of the control device (60) has a casing (71) on the inside of which there can be translated a cable (72) which is connected to a part of the prop (56) on one hand and on the other hand to the distributer (86) of the control device (60). To that effect, as soon as the prop (56) is removed from its retracted position towards its placement position or vice versa, this causes the translation of the cable (72) in the casing (71) to move and allows that the distributer (86) is put into the second position (B), or into the first position (A).

One notices that the closed hydraulic circuit (85) is equipped with a refill opening (92) located on the hydraulic cylinder (80) and runs into the second chamber (84). This opening (92) makes it possible to refill the closed hydraulic circuit (85) and to close it once said hydraulic circuit (85) is completely filled.

The traction element (58) also has an adjustment device (93) which makes it possible to adjust the value which lightens the cutting mechanism (6). This adjustment device (93) extends from the end of the draw-spring (59) where it is connected to the cutting mechanism (6). It is comprised of the slide (79) which is already out as well as a second connecting element (94) of the draw-spring (59) in which the slide (79) is guided so that it can slide and more or less follows the longitudinal axis of the draw-spring (59). The slide (79) has a first stop (95) located on the end of said slide (79) on the inside of the draw-spring (59), said first stop (95) being intended to come in contact with the interior face of the second connecting element (94) located on the inside of the draw-spring (59) when the mower (1) is in a working position. The slide (79) also has a second stop (96) which is on the outside of the draw-spring (59) between the exterior face of the second connecting element (94) and the pivot connection (61) which connects the slide (79) to the cutting mechanism (6). This second stop (96) is comprised of a pin engaged in one of several bores (97) which are on the slide (79). This pin (96) is intended to stop on the exterior face of the second connecting element (94) at the time when the mower (1) is put in transport position. The different bores (97) can each have the pin (96) and can thus influence the desired height of the lightening of the cutting mechanism (6).

One can also see that the hitching structure (4) of the mower (1) is comprised of a frame (73) which supports the three hitching points (7) and a connecting device (74) which connects said frame (73) to the first journal (11). The connecting device (74) has a trunnion (75) connected to its lower end at the first journal (11) and guides the frame (73) of the hitching structure (4) around a geometric axis (76) which is more or less vertical. Among other things the upper ends of the trunnion (75) of the connection device (74) are connected to the control device (60) of the traction element (58), the pipe (30) of the locking element (28) and a longitudinal end of the single action hydraulic cylinder (50). Due to such a layout the cutting mechanism (6) and the support beam (5) can pivot jointly to the back around the geometric axis (76) of the connecting device (74) when the cutting mechanism (6) hits an obstacle which it cannot overcome during work. For this purpose there is a trip device (77) between the support beam (5) and the frame (73) of the hitching structure (4) which maintains the cutting mechanism (6) and the support beam (5) in the normal working position and which also makes the pivoting of the cutting mechanism (6) and the support beam (5) around the geometric axis (76) of the connection device (74) possible when said cutting mechanism (6) encounters such an obstacle.

The mower (1) in FIGS. 1 through 7 which is described above, works as follows:

The mower (1) is connected to three hitching points (8) of the lifting device (9) of the motor vehicle (2) with the help of the hitching structure (4) and the transmission shaft (24) with universal joints is coupled to the power take-off (not shown) of said motor vehicle (2).

During operation the cutting mechanism (6) is in its working position as is shown in FIGS. 1 and 3. The motor vehicle (2) moves the mower (1) in a direction of advance (10) of the working direction and its power take-off causes the disks (15) to rotate with the help of the transmission elements [drive shaft (24) with universal joints, second pulley (25), belts (26), first pulley (23)], the input shaft (22) and the diverse drive elements (not shown) located in the countershaft transmission housing (19) and the diverse drive elements (not shown) in the cutting bar (13).

While turning, the cutting tools (16) of the disks (15) cut the product which is to be cleaned up and which is in the cutting zone and the drums (17) caliper the swath of the cut product located behind the cutting mechanism (6).

If the support beam (5) can pivot a little around the geometric axis (11') of the first journal (11) and if the cutting mechanism (6) can pivot around the geometric axis (12') of the second journal (12) with regard to the support beam (5), then said cutting mechanism (6) can adapt well to the shape of the terrain. The extension spring (59) which is tightened ensures that the distributer (86) and more precisely its non-return (89) maintains the piston (82) and the rod (62) of the hydraulic cylinder (80) of the control device (60) in the position shown in FIG. 6, and reduces the force with which the cutting mechanism (6) rests on the ground.

When the mower (1) is to be transported, the rotating disks (15) are stopped.

In order to then shift the mower (1) into a transport position (FIG. 4) the lifting device (9) of the motor vehicle (2) is first lifted. This causes the mower (1) to lift when the support beam (5) no longer pivots towards the bottom around the geometric axis (11') of the first journal (11) due to the limiter (29) of the locking element (28) and when the pivoting lever (52) stumbles against the transmission housing (19) which has a chuck face (78) which is specifically for this purpose. In this intermediary position called "swath position" (not shown) in which the cutting mechanism (6) is more or less horizontal above the ground, the small rope (40) is pulled which makes the catch (41) pivot into the unlocked position. In doing so the catch (41) drives the lock (32) into a locked transport position. While still pulling on the cord (40), the cutting mechanism (6) then is pivoted around the geometric axis (12') of the second journal (12) with the help of a maneuvering element (49) (single action hydraulic cylinder (50)). When the cutting mechanism (6) is in its lifted transport position, the small rope (40) is no longer pulled in order to allow the catch (41) to latch into the latching element (45) of the cutting mechanism (6) with the help of the spring (44). Then the holding element (46) of the cutting mechanism (6) compresses the elastically deformable element (47) (rubber stop (48)) and maintains the lock (32) in the locked position. The mower then can be transported because the cutting mechanism (6) is immobile with regard to the hitching structure (4).

One notices that when the cutting mechanism (6) pivots around the geometric axis (12') of the second journal (12) the slide (79) slides in the second connection element (94) towards the inside of the draw-spring (59). The rod (62) of the hydraulic cylinder (80) as far as it is concerned, does not move inside the body (81) of the hydraulic cylinder (80) with said pivoting motion.

Accordingly, if the user wishes to move the mower (1) from the transport position into the working position, he pulls on the small rope (40) which retracts the catch (41) and allows the cutting mechanism (6) to pivot around the geometric axis (12') of the second journal (12) as soon as the fluid contained in the single action hydraulic cylinder (50) can return to the motor vehicle (2). In doing so the cutting mechanism (6) pivots towards its swath position due to its weight (the pivoting motion is initialized by the rubber stop (48)) while at the same time slowing the flow of the fluid in the single action hydraulic cylinder (50) towards the motor vehicle (2).

As soon as the cutting mechanism (6) has pivoted a certain angle, the user can release the small rope (40). This causes a more or less simultaneous reset of the catch (41) to its initial position due to the action of the spring (44) and causes the lock (32) to return to the unlocked position due to the action of the spring (38). The downward pivoting motion of the cutting mechanism (6) is stopped when the single-action hydraulic cylinder (50) is in its lowest position. When the cutting mechanism (6) pivots downward, the slide (79) slides into the second connecting element (94) to the outside until the first stop (95) supports the interior face of said second connecting element (94) which tightens the draw-spring (59) and lightens the cutting mechanism (6). By then lowering the lifting device (9) of the motor vehicle (2) the cutting mechanism (6) is lightened and makes contact with the ground. The lifting device (9) is nonetheless dropped even more until the limiter (29) is on a mid-level (i.e. the axis (35) is more or less in the middle of the slat (34) of the tie-rod (31) of the limiter (29)) and until the pivoting lever (52) is dislodged from the chuck face (78) of the transmission housing (19).

In order to place the mower (1) the user can first lower the cutting mechanism (6) to the ground level and can then place the set down element (55) into its placement position, or, on the other hand, he can first place the set down element (55) into its placement position and can then lower the cutting mechanism (6) to the ground level.

In the first case, the remote control (69) which connects the set down element (55) to the control device (60) causes the distributer (86) to be placed into the second position (B) (FIG. 7). Due to the action of the draw-spring (59) the fluid which is in the first chamber (83) flows into the second chamber (84) across the throttle (90). In doing so the rod (62) leaves the body (81) of the hydraulic cylinder (80) and the draw-spring (59) is relaxed, and one notices that the relaxation of the draw-spring (59) is progressive due to the fact that the fluid flows from the first chamber (83) into the second chamber (84) and that this process is slowed by the throttle (90).

By lowering the lifting device (9) of the motor vehicle (2) completely, the cutting mechanism (6) rests on the ground (at least to the extent that this already is the case) and the beam support (5) pivots around the geometric axis (12') of the second journal (12). The pivoting movement of the support beam (5) is stopped when the prop (56) makes contact with the ground. In this position it is advantageous that the pin (35) of the limiter (29) is at least in the middle of the slot (34) of the tie-rod (31) and that the pivoting lever (52) is dislodged from the chuck face (78) of the transmission housing (19). The mower (1) thus rests longitudinally on the ground with the help of the cutting mechanism (6) and the prop (56). It therefore is easy to uncouple it from the motor vehicle (2).

In the case in which the user first places the set down element (55) into the placement position and then lowers the cutting mechanism (6) to the ground, the fluid in the first chamber (83) flows into the second chamber (84) and across the throttle (90) while the cutting mechanism (6) pivots downward around the geometric axis (12') of the second journal (12).

When the mower (1) is placed, as is shown in FIG. 5, the draw-spring (59) is completely relaxed and the slide (79) can slide into the second connecting element (94). In this position the hitching structure (4) can pivot with regard to the support beam (5) around the geometric axis (11') of the first journal (11) into the location allowed by the limiter (29). Such a layout makes it easy to uncouple the mower (1) from the motor vehicle (2) and to subsequently attach the mower (1) to the motor vehicle (2).

To move the mower (1) from its placement position into the transport position the individual steps are carried out in reverse order. That is to say one begins by connecting the three hitching points (7) of the hitching structure (4) to the three hitching points (8) of the lifting device (9) of the motor vehicle (2) by pivoting, if necessary, the hitching structure (4) around the geometric axis (11') of the first journal (11) and by coupling the drive shaft (24) with the universal joints to the power take-off (not shown) of the motor vehicle (2). Then one lifts the lifting device (9) of the motor vehicle (2) which causes the mower (1) to lift. Then the user pulls on the small rope (40) in order to lock the limiter (29). While maintaining the pull he supports the maneuvering element (49) (single-action hydraulic cylinder (50)) so that the cutting mechanism (6) is lifted into the transport position. As soon as the cutting mechanism (6) is in its lifted transport position, the user releases the pull on the small rope (40) in order to allow the catch (41) to latch to the latching element (45) of the cutting mechanism (6) with the help of the spring (44).

While the cutting mechanism (6) is lifted, the slide (79) slides first into the second connecting element (94) towards the inside of the draw-spring (59) until the second stop (96) supports on the exterior face of the second connecting element (94). From this point on the draw-spring (59) which is compressed, penetrates the rod (62) in the body (81) of the hydraulic cylinder (80) which causes the fluid in the second chamber (84) to flow into the first chamber (83) across the throttle (90).

Now only the set down element (55) has to be retracted, which, with the help of the remote control (69) and the automatic recall device (91), places the distributer (86) into the first position (A). The non-return valve (89) thus prevents the fluid in the first chamber (83) from flowing out. The hydraulic cylinder (80) is blocked in this position. The control device (60) again is activated and the draw-spring (59) is tightened when the cutting mechanism (6) is pivoted into the working position and it can again fulfill its lightening function of the cutting mechanism (6).

One notices that the set down element (55) can also be retracted before the cutting mechanism (6) is lifted. Thus the fluid in the second chamber (84) flows into the first chamber (83) across the non-return valve (89) while the cutting mechanism (6) is lifted.

The adjustment of the intensity of the lightening of the cutting mechanism (6) is carried out by replacing the pin (96) of the second stop along the longitudinal axis of the slide (79), i.e. by engaging it in one of the bores (97) which are on the slide (79) for this purpose. Thus, by extending the pin (96) of the pivot connection (61), the rod (62) enters more into the body (81) of the hydraulic cylinder (80) when the cutting mechanism (6) pivots into the transport position. A larger amount of the fluid flows from the second chamber (84) into the first chamber (83). When the cutting mechanism (6) is placed into the working position, the draw-spring (59) is tightened more and thus causes a lightening of the cutting mechanism (6) to reduce even more.

On the other hand, when one narrows the pin (96) of the pivot connection (61), the rod (62) does not enter the body (81) as much. When the cutting mechanism (6) is brought into the working position the draw-spring (59) is less tightened and causes the cutting mechanism (6) to reduce less.

Figure 8:
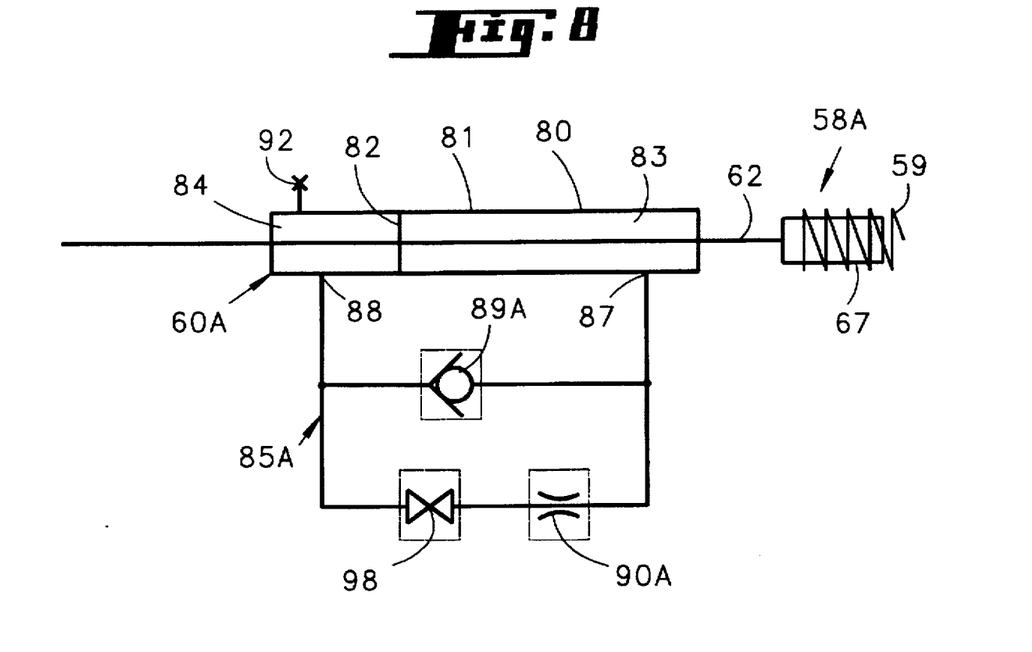
FIG. 8 shows a schematic view of a second embodiment of a control device designed to equip the cutting device in accordance with the invention, said control device being active.

FIG. 8 shows, in a schematic manner, a second example of the embodiment of a control device in accordance with the present inventive idea. This control device (60A) is to equip the cutting device as it is described above and has a certain number of elements which are described above. These elements thus have the same reference numbers and are not described. It also has a certain number of elements which are comparable to the elements of the control device (60). These elements are marked with the same reference numbers as the comparable elements of the control device (60) followed by letter A.

They are only described if it is necessary.

The control device (60A) of the traction element (58A), which is shown in FIG. 8, as a whole is similar to control device (60). It is comprised of a closed hydraulic circuit (85A) which allows the two chambers (83, 84) of the hydraulic cylinder (80) to communicate either across a non-return valve (89A) or across a valve (98) and a throttle (90A) connected in series.

In effect, the hydraulic cylinder (80) is connected in parallel with the non-return valve (89A) on one hand and with the valve (98) and the throttle (90A) on the other hand.

The control device (60A) works more or less identical to control device (60).

In fact, when the draw-spring (59) must be relaxed, i.e. when the control device (60A) must be made inactive, one opens the valve (98) and the fluid in the first chamber (83) flows into the second chamber (84) across the throttle (90A) and the valve (98).

On the other hand, when the control device (60A) is to be reactivated, the fluid in the second chamber (84) flows into the first chamber (83) across the non-return valve (89A) when the valve (98) is already closed or, if the latter is still open, possibly evenly across the valve (98) and the throttle (90A) while the cutting mechanism (6) is lifted.

Figure 9:
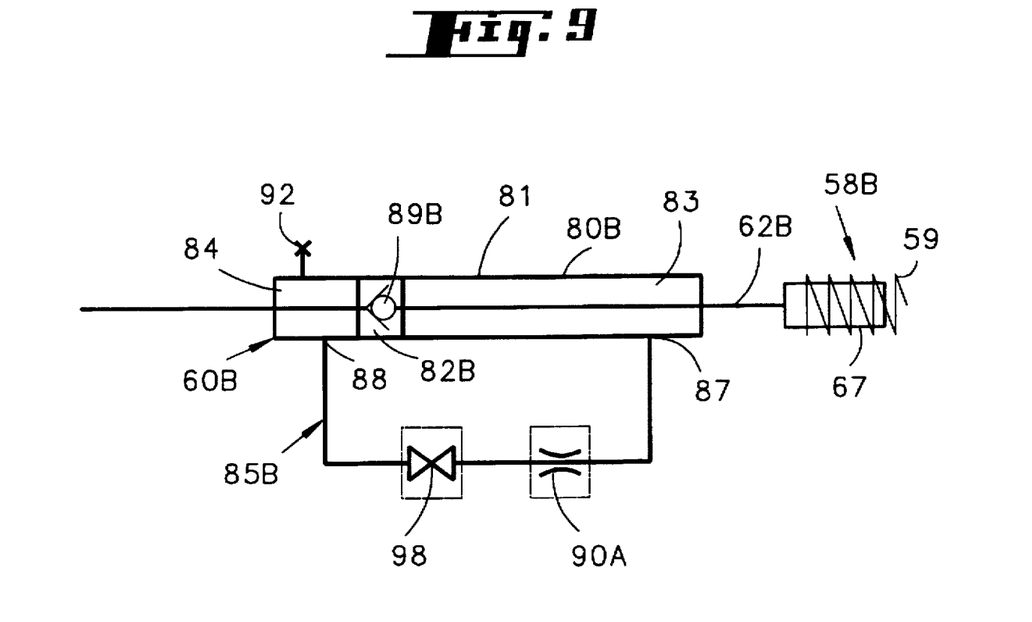
FIG. 9 shows a schematic view of a third embodiment of a control device designed to equip the cutting device in accordance with the invention, said control device being active.

FIG. 9 shows, in a schematic manner, a third example of the embodiment of a control device in accordance with the present inventive idea. This control device (60B) is to equip the cutting device as it is described above and has a certain number of elements which are described above. These elements thus have the same reference numbers and are not described. It also has a certain number of elements which are comparable to the elements of the control devices (60, 60A). These elements are marked with the same reference numbers as the comparable elements of the control device (60, 60A) followed by letter B. They are only described if it is necessary.

The control device (60B) of the traction element (58B), shown in FIG. 9, as a whole is similar to the control device (60A). The only difference lies in the fact that the non-return valve (89B) is integrated into the piston (82B) of the rod (62B) of the hydraulic cylinder (80B) and that the closed hydraulic circuit (85B) has a valve (98) and a throttle (90A) which are connected in series between the opening (87) of the first chamber (83) and the opening (88) of the second chamber (84).

Thus, when he draw-spring (59) is to be relaxed, i.e. when the control device (60B) must be made inactive, one opens the valve (98) and the fluid in the first chamber (83) flows into the second chamber (84) across the throttle (90A) and the valve (98).

On the other hand, when the control device (60B) is to be reactivated the fluid in the second chamber (84) flows into the first chamber (83) across the non-return valve (89B) when the valve (98) is already closed or, if the latter is still open, possibly in equal amounts across the valve (98) and the throttle (90A) while the cutting mechanism (6) is lifted.

Figure 10:
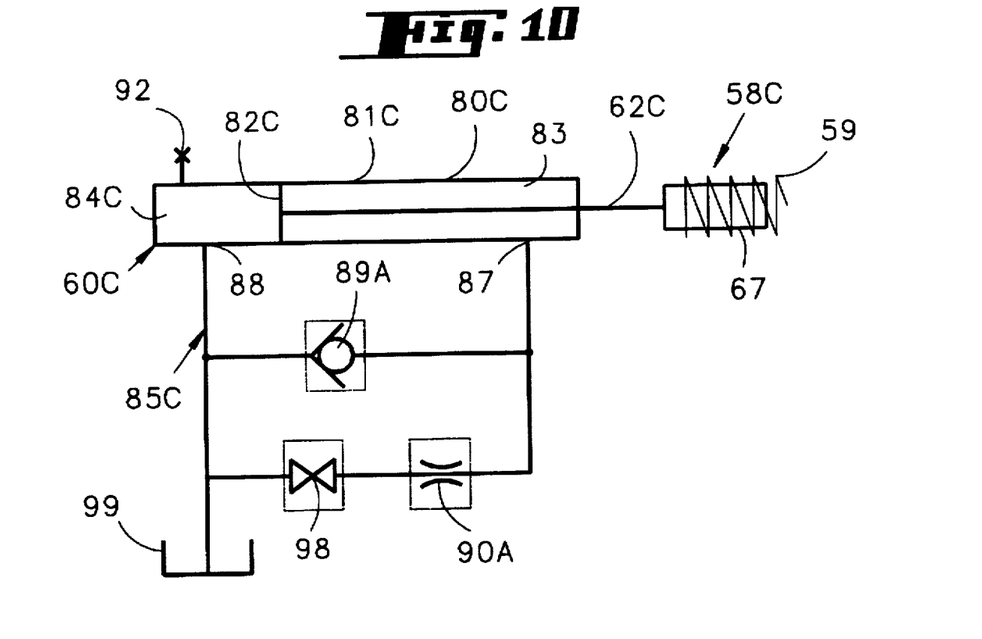
FIG. 10 shows a schematic view of a fourth embodiment of a control device designed to equip the cutting device in accordance with the invention, said control device being active.

FIG. 10 shows, in a schematic manner, a fourth example of the embodiment of a control device in accordance with the present inventive idea. This control device (60C) is to equip the cutting device as it is described above and has a certain number of elements which are described above. These elements thus have the same reference numbers and are not described. It also has a certain number of elements which are comparable to the elements of the control devices (60A). These elements are marked with the same reference numbers as the comparable elements of the control device (60A) followed by letter C. They are only described if it is necessary.

The control device (60C) of the traction element (58C), shown in FIG. 10, as a whole is similar to the control device (60A). The difference lies in the fact that the rod (62C) of the hydraulic cylinder (80C) does not flow into the second chamber (84C) of the body (81C). Because of this the cross section of the second chamber (84C) is larger than the cross section of the first chamber (83). In order to compensate for the difference in volume when the fluid flows from one chamber into the other, the hydraulic circuit (85C) has an additional fluid reservoir (99).

When the draw-spring (59) is to be relaxed, one opens the valve (98) and the fluid in the first chamber (83) flows into the second chamber (84C) across the throttle (90A) and the valve (98) and a certain amount of fluid is sucked into the reservoir (99).

On the other hand, when the control device (60C) is to be reactivated the fluid in the second chamber (84C) flows into the first chamber (83) either across the non-return valve (89A) when the valve (98) is already closed or, if the latter is still open, possibly in equal amounts across the valve (98) and the throttle (90A) and the surplus fluid returns to the reservoir (99).

Figure 11:
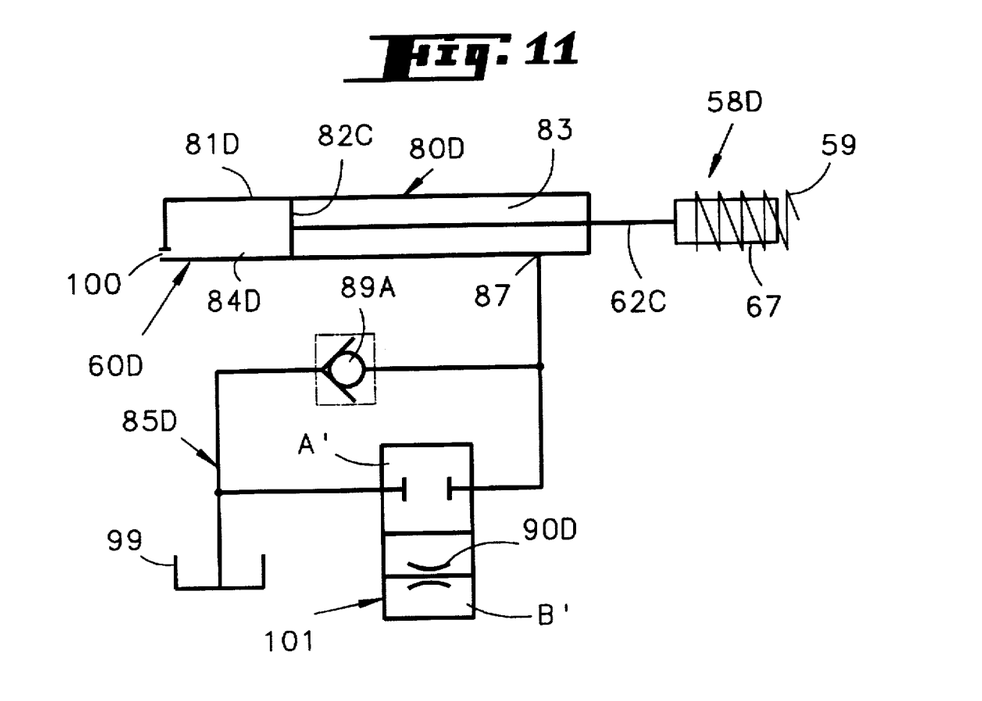
FIG. 11 shows a schematic view of a fifth embodiment of a control device designed to equip the cutting device in accordance with the invention, said control device being active.

FIG. 11 shows, in a schematic manner, a fifth example of the embodiment of a control device in accordance with the present inventive idea. This control device (60D) is to equip the cutting device as it is described above and has a certain number of elements which are described above. These elements thus have the same reference numbers and are not described. It also has a certain number of elements which are comparable to the elements of the above control devices. These elements are marked with the same reference numbers as the comparable elements of the above control device followed by letter D. They are only described if it is necessary.

The control device (60D) of the traction element (58D), shown in FIG. 11, has a simple hydraulic cylinder (80D) with the first chamber (83) of this body (81D) crossed by the rod (62C) of the rod (62C) while the first chamber (83) is connected to the hydraulic circuit (85D) via its opening (87). As far as the second chamber (84D) is concerned, it has an opening (100) which connects the second chamber (84D) to the open air. The hydraulic circuit (85D) has a non-return valve (89A) connected in parallel with a distributer (101). This distributer (101) can be placed in two positions (A', B'): the first position (A') prevents any kind of fluid from entering the first chamber (83) and the second position (B') allows the fluid to leave the first chamber (83) across a throttle (90D). This distributer (101) is a valve with an integrated throttle.

When the draw-spring (59) is to be relaxed, one places the distributer (101) into the second position (B') and the fluid in the first chamber (83) flows into the reservoir (99) across the throttle (90D).

On the other hand, when the control device (60D) is to be reactivated the fluid in the reservoir (99) flows into the first chamber (83) either across the non-return valve (89A) when the distributer (101) is already closed (first position A') or, if the latter is still open (second position B'), possibly in equal amounts across the throttle (90D).

When the valve (98, 101) is closed, one notices that in control devices (60A, 60B, 60C, 60D), the valve (98, 101) and the non-return valve (89A, 89B) which are connected in parallel prevent the fluid in the first chamber (83) from leaving despite the traction force exerted by the draw-spring (59) on the rod (62, 62B, 62C) of the hydraulic cylinder (80, 80B, 80C, 80D).

Finally, there are other possible modifications, notably with regard to the structure of the different elements or to the substitution of equivalent technologies without leaving the extent of the protection defined in the claims.

This is how it is possible to realize the control devices from different elements of different embodiment examples of control devices as described above.

It is evident that it is possible that the valve (98, 101) can be activated with the help of a remote control of a remote control type (69) so that when the prop (56) of the set down element (55) is in a retracted position (cutting mechanism (6) in working position), the draw-spring (59) can reduce said cutting mechanism (6) and, on the other hand, when the prop (56) is in the placement position, the action of the draw-spring (59) is voided.

It is also possible to equip the valve (98, 101) with an automatic recall device comparable to the automatic recall device (91) of the distributer (86) which closes the valve (98, 101) when the prop (56) is retracted.

If there is no remote control, the user can operate the distributer (86) or the valve (98, 101) manually separate from the prop (56).

It is also possible to equip the cutting device with a traction element (58) which is comprised of two or several draw-springs (59).

In the simplified embodiment examples, the distributer (86) and the hydraulic circuits (85A, 85B, 85C, 85D) must not have a non-return valve (89, 89A).

In these cases, the user must open the distributer or the valve before the cutting mechanism (6) is lifted from the placement position to the transport position, and then must close said distributer or said valve before he begins working.

It is possible to have other adjustment devices which are used to lighten the cutting mechanism (6). For example, it is possible to act on the distributer (86) or the valve (98, 101) in order to make the rod (62, 62B, 62C) leave the body (81, 81C, 81D), which allows a reduction in tension in the draw-spring (59), and, consequently, the value of the lightening of said cutting mechanism (6).

It is also possible to have pneumatic control devices.

Finally, it is understood that the invention can be applied to different types of mowers (1) shown in the different figures.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cutting device comprising:
   a cutting mechanism which, while in operation, works crosswise to a direction of operation;
   a hitching structure designed to be connected to a motor vehicle;
   a support beam joined to the hitching structure with a first journal having an axis directed towards a front, and to the cutting mechanism with a second journal having an axis directed to the front; and
   a traction element which is comprised of at least one draw-spring and a control device, said at least one draw-spring designed, while in operation, to lighten the cutting mechanism and said control device designed to invalidate the action of said at least one draw-spring when the cutting device is uncoupled from the motor vehicle, said control device being comprised of at least a rod, said rod having one end attached to said at least one draw-spring;
   wherein the control device comprises a cylinder which includes:
   said rod;
   a body;
   a piston connected to said rod which divides the body into first and second chambers; and
   a fluid circuit which has a device which allows the fluid to enter into the first chamber located on a side of the at least one draw-spring when the at least one draw-spring must be tightened, and allows the fluid to leave said first chamber when the at least one draw-spring must be relaxed.

2. A cutting device in accordance with claim 1, wherein said device has a deceleration element which slows a flow of the fluid from the first chamber.

3. A cutting device in accordance with claim 2, wherein said deceleration element of the fluid of the first chamber has at least one throttle.

4. A cutting device in accordance with claim 1, wherein said device comprises a valve.

5. A cutting device in accordance with claim 4, wherein the valve is connected in series with a deceleration element which slows a flow of the fluid from the first chamber.

6. A cutting device in accordance with claim 5, wherein the deceleration element which slows the flow of the fluid from the first chamber has at least one throttle.

7. A cutting device in accordance with claim 4, wherein said valve is comprised of a distributer which prevents any fluid from entering and leaving the first chamber when it is in a first position and which makes a deceleration element which slows the flow of the fluid from the first chamber operational when it is in a second position.

8. A cutting device in accordance with claim 7, wherein said deceleration element which slows the flow of the fluid from the first chamber is integrated into the distributer.

9. A cutting device in accordance with claim 8, wherein the deceleration element which slows the flow of the fluid leaving the first chamber has at least one throttle.

10. A cutting device in accordance with claim 4, further comprising a remote control to activate the valve.

11. A cutting device in accordance with claim 10, wherein the remote control opens the valve.

12. A cutting device in accordance with claim 4, further comprising an automatic recall device designed to place and maintain the valve in its closed position with said automatic recall device being integrated into said valve.

13. A cutting device in accordance with claim 1, wherein said device comprises a non-return valve which allows the fluid to enter the first chamber but prevents it from leaving the first chamber.

14. A cutting device in accordance with claim 13, wherein the non-return valve and a deceleration element which slows the flow of the fluid leaving the first chamber are integrated into a distributer with said non-return valve being operational when the distributer is in a first position and said deceleration element being operational when the distributer is in a second position.

15. A cutting device in accordance with claim 14, wherein the deceleration element which slows the flow of the fluid leaving the first chamber has at least one throttle.

16. A cutting device in accordance with claim 14, further comprising a remote control for activating the distributer.

17. A cutting device in accordance with claim 16, wherein the remote control puts the distributer into said second position.

18. A cutting device in accordance with claim 14, further comprising an automatic recall device designed to place and maintain the distributer into said first position, said automatic recall device being integrated into said distributer.

19. A cutting device in accordance with claim 13, wherein the non-return valve is connected in parallel with a valve connected in series with a deceleration element which slows the flow of the fluid leaving the first chamber.

20. A cutting device in accordance with claim 19, further comprising:

a remote control to open the valve; and an automatic recall device designed to place and maintain said valve in its closed position, said automatic recall device being integrated into said valve.

21. A cutting device in accordance with claim 19, wherein:

the valve is comprised of a distributer which prevents any fluid from entering and leaving the first chamber when it is in a first position and which activates the deceleration element which slows the flow of the fluid leaving the first chamber when it is in a second position; and the deceleration element which slows the flow of the fluid leaving the first chamber is integrated into said distributer.

22. A cutting device in accordance with claim 19, wherein the non-return valve is integrated into the piston.

23. A cutting device in accordance with claim 1, wherein the rod crosses the first and second chambers of the body of the cylinder so that there are two more or less equal cross sections.

24. A cutting device in accordance with claim 23, wherein the fluid circuit is a closed circuit.

25. A cutting device in accordance with claim 1, wherein the rod crosses the first chamber of the body of the cylinder once and the fluid circuit has a reservoir.

26. A cutting device in accordance with claim 1, further comprising a set-down element which is connected to the support beam and which is intended to maintain it in a placement position when the cutting device is uncoupled from the motor vehicle, said set-down element being in a retracted position when the cutting device is connected to the motor vehicle.

27. A cutting device in accordance with claim 26, further comprising a remote control which is connected to said set-down element in a manner in which the set-down element which is in the placement position opens a valve or places a distributer into its second position.

28. A cutting device in accordance with claim 1, wherein the body of the cylinder is connected to the hitching structure using a bonding.

29. A cutting device in accordance with claim 28, wherein said bonding has a pivoting axis which is more or less parallel to the axis of the first journal.

30. A cutting device in accordance with claim 1, further comprising a reactivation device which reactivates the control device.

31. A cutting device in accordance with claim 30, wherein said reactivation device automatically reactivates the control device when said cutting device is moved from a placement position into a transport position.

32. A cutting device in accordance with claim 30, wherein said reactivation device comprises, at a level of a connection of the at least one draw-spring to the cutting mechanism, a slide which slides more or less parallel to a longitudinal axis of the at least one draw-spring and is fitted with a first stop designed to limit an exit of the slide and a second stop designed to limit a reentry of said slide.

33. A cutting device in accordance with claim 1, further comprising an adjustment device which adjusts an intensity of a lightening caused by the at least one draw-spring.

34. A cutting device in accordance with claim 33, wherein said adjustment device which controls the intensity of the lightening comprises, at a level of a connection of the at least one draw-spring to the cutting mechanism, a slide which slides more or less parallel to a longitudinal axis of the at least one draw-spring and is fitted with a first stop which is designed to limit an exit of the slide and a second adjustable stop which is to limit a more or less significant reentry of said slide.

35. A cutting device in accordance with claim 13, wherein the non-return valve is connected in parallel with a valve.

* * * * *